(12) United States Patent
Chen et al.

(10) Patent No.: US 8,995,810 B2
(45) Date of Patent: Mar. 31, 2015

(54) FLEXIBLE STRENGTH MEMBERS FOR WIRE CABLES

(75) Inventors: Buo Chen, Hillsborough, NJ (US); Bharat I. Chaudhary, Princeton, NJ (US); Chester J. Kmiec, Phillipsburg, NJ (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 47 days.

(21) Appl. No.: 13/821,633

(22) PCT Filed: Sep. 21, 2011

(86) PCT No.: PCT/US2011/052452
§ 371 (c)(1),
(2), (4) Date: Mar. 8, 2013

(87) PCT Pub. No.: WO2012/044498
PCT Pub. Date: Apr. 5, 2012

(65) Prior Publication Data
US 2013/0177282 A1    Jul. 11, 2013

Related U.S. Application Data

(60) Provisional application No. 61/387,581, filed on Sep. 29, 2010.

(51) Int. Cl.
*G02B 6/44* (2006.01)
*B29C 70/08* (2006.01)
*B29C 70/52* (2006.01)
*C08J 5/10* (2006.01)
*C08L 23/10* (2006.01)

(52) U.S. Cl.
CPC ............ *G02B 6/4434* (2013.01); *B29C 70/081* (2013.01); *B29C 70/523* (2013.01); *C08J 5/10* (2013.01); *C08L 23/10* (2013.01); *G02B 6/4429* (2013.01); *C08J 2323/10* (2013.01); *C08L 2205/03* (2013.01); *C08L 2205/16* (2013.01)
USPC .............................. 385/103; 385/100; 385/113

(58) Field of Classification Search
None
See application file for complete search history.

(56) References Cited

U.S. PATENT DOCUMENTS

| | | | |
|---|---|---|---|
| 3,517,086 A * | 6/1970 | Kenzo et al. | 524/161 |
| 4,413,110 A | 11/1983 | Kavesh et al. | |
| 4,581,393 A | 4/1986 | Fortier et al. | |
| 4,643,940 A | 2/1987 | Shaw et al. | |
| 5,084,221 A | 1/1992 | Matsuno et al. | |
| 5,561,729 A | 10/1996 | Parris | |

(Continued)

FOREIGN PATENT DOCUMENTS

| EP | 0945479 A2 | 9/1999 |
|---|---|---|
| EP | 2450321 A1 | 5/2012 |

(Continued)

OTHER PUBLICATIONS

Owens Corning, OCV Reinforcements SE4121 Product Information, 2008.

*Primary Examiner* — Rhonda Peace
(74) *Attorney, Agent, or Firm* — Whyte Hirschboeck Dudek S.C.

(57) ABSTRACT

This invention relates to a fiber reinforced plastic material with improved flexibility and high tensile strength for use in optic cables. The strength member composition comprises a polypropylene based thermoplastic resin, a continuous fiber having a modulus greater than 80 PGa, and talc.

18 Claims, 1 Drawing Sheet

(56) References Cited

U.S. PATENT DOCUMENTS

| | | | |
|---|---|---|---|
| 5,574,816 A | 11/1996 | Yang et al. | |
| 5,761,362 A * | 6/1998 | Yang et al. | 385/109 |
| 5,891,560 A | 4/1999 | Edwards et al. | |
| 6,400,873 B1 * | 6/2002 | Gimblet et al. | 385/102 |
| 6,421,486 B1 * | 7/2002 | Daneshvar et al. | 385/109 |
| 6,524,702 B1 * | 2/2003 | Betso et al. | 428/379 |
| 6,654,525 B2 * | 11/2003 | Nechitailo et al. | 385/103 |
| 6,748,146 B2 * | 6/2004 | Parris | 385/109 |
| 7,346,244 B2 * | 3/2008 | Gowan et al. | 385/113 |
| 7,585,563 B2 * | 9/2009 | Kashikar et al. | 428/392 |
| 7,603,011 B2 | 10/2009 | Varkey et al. | |
| 2001/0036548 A1 * | 11/2001 | Halloran et al. | 428/355 R |
| 2002/0181906 A1 * | 12/2002 | Hurley et al. | 385/102 |
| 2003/0068145 A1 * | 4/2003 | Nechitailo et al. | 385/103 |
| 2003/0068146 A1 * | 4/2003 | Nechitailo et al. | 385/103 |
| 2003/0099446 A1 * | 5/2003 | Witt et al. | 385/109 |
| 2003/0210879 A1 * | 11/2003 | Oshio et al. | 385/128 |
| 2004/0002559 A1 * | 1/2004 | Troutman et al. | 524/100 |
| 2004/0120664 A1 | 6/2004 | Dewitt | 385/103 |
| 2005/0079779 A1 | 4/2005 | McLeod et al. | |
| 2007/0208119 A1 * | 9/2007 | Ueda et al. | 524/284 |
| 2008/0118728 A1 | 5/2008 | Magley et al. | |
| 2008/0223602 A1 * | 9/2008 | Gallucci et al. | 174/110 SR |
| 2009/0234060 A1 * | 9/2009 | Haralur et al. | 524/539 |
| 2010/0147548 A1 * | 6/2010 | Bhandari et al. | 174/110 SR |
| 2012/0178868 A1 * | 7/2012 | Esseghir et al. | 524/504 |
| 2013/0071076 A1 | 3/2013 | Chen et al. | |
| 2013/0072626 A1 * | 3/2013 | Chen | 524/584 |
| 2013/0177282 A1 * | 7/2013 | Chen et al. | 385/102 |
| 2013/0260624 A1 | 10/2013 | Rastogi et al. | |
| 2013/0273369 A1 * | 10/2013 | Zhou et al. | 428/394 |

FOREIGN PATENT DOCUMENTS

| | | |
|---|---|---|
| GB | 1462160 | 1/1977 |
| JP | 60033520 | 2/1985 |
| JP | 1183609 | 7/1989 |
| JP | 3167513 | 7/1991 |
| JP | 2008138320 | 6/2008 |
| JP | 2008139582 | 6/2008 |
| WO | 96/28258 A1 | 9/1996 |
| WO | 2012/044498 A1 | 4/2012 |

* cited by examiner

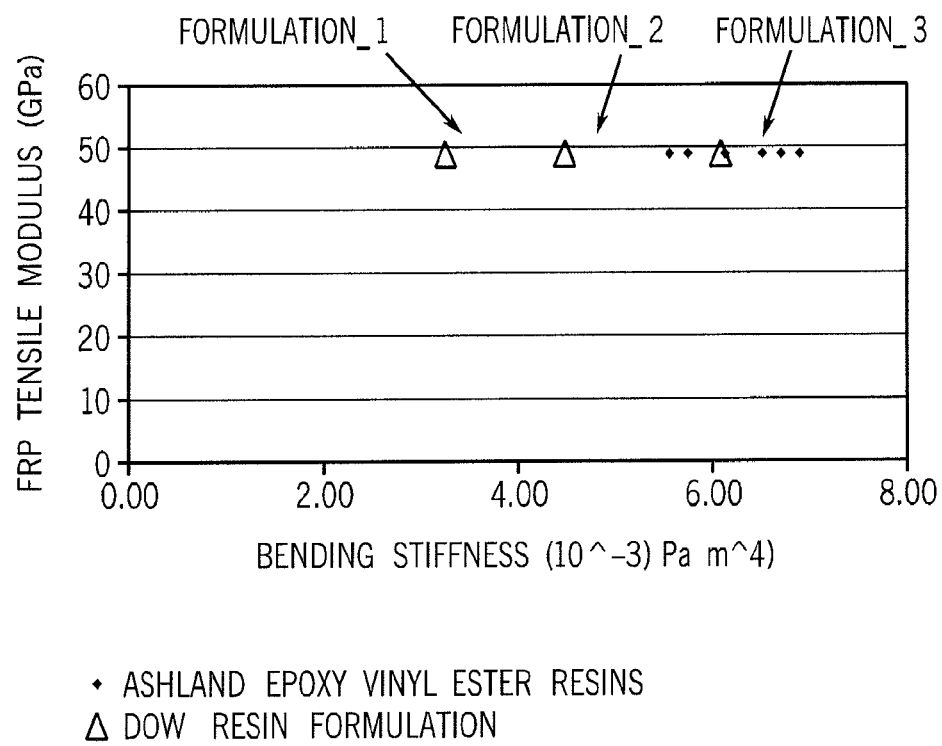

FLEXIBLE STRENGTH MEMBERS FOR WIRE CABLES

CROSS REFERENCE TO RELATED APPLICATION

This application claims priority to U.S. provisional patent application Ser. No. 61/387,581 filed on Sep. 29, 2010, the entire content of which is incorporated by reference herein.

BACKGROUND OF THE INVENTION

1. Field of the Invention

This invention relates to a fiber reinforced plastic material with improved flexibility and high tensile strength for use as a strength member in optic cables.

2. Description of the Related Art

This invention relates to the construction of a strength member used in a fiber-optic cable (FOC). In the absence of metal conductors, fiber optic cables rely on a design comprising a strength member to provide sufficient protection for the fibers from longitudinal and transverse stresses either during installation or later during service. Strength members are typically made of fiber reinforced plastic (FRP), also called glass reinforced plastic (GRP).

Fiber-reinforced plastics are composite materials made of a polymer matrix reinforced with fibers. The fibers are usually glass (most popular), carbon, or aramid, while conventionally the polymer is usually an epoxy, or vinyl ester.

Using the conventional resin system, the FRP is very stiff. Typically it has a bending stiffness greater than $6 \times 10^{-3}$ Pa m$^4$ for a 2 millimeter (mm) diameter rod, resulting in an optical fiber cable that is very hard to bend. While the high bending stiffness is preferred in some outdoor applications (i.e., sometimes cables are needed to be "pushed" through small diameter conduits during installation), it is highly undesirable for other applications (outdoor/indoor), where a cable needs to go inside a building and make several turns before it reaches its destination. To increase the flexibility of the cable, one has to either reduce the size of the FRP (which will reduce the total tensile strength of the cable) or to change the cable design. For instance, some cable manufacturers have modified the traditional round FOC cable with a central strength member into a flat, "tape looking" cable, which uses a flat geometry (instead of circular shape) with multiple FRPs in parallel along its width. The FRPs used in the flat cable design have a relatively small diameter, but its total tensile strength is equivalent to the traditional round cable. Compared to the traditional round cable with a central strength member, the flat cable design offers higher flexibility in one axis (along the direction of its width) while maintaining the total tensile strength of the cable unchanged. However changing the cable design does cause higher complexity in manufacturing.

SUMMARY OF THE INVENTION

In one embodiment the invention is a strength member comprising: (a) a polypropylene based thermoplastic resin composition and (b) a continuous fiber having a modulus greater than 80 gigapascals (GPa). The polypropylene based thermoplastic resin may further comprise a reinforcing filler such as talc. The composition is useful in the manufacture of strength members for wire and cable, particularly fiber optic cable.

In one embodiment the invention is a process for manufacturing a strength member comprising the steps: (a) heating a polypropylene based resin composition, optionally, including a filler, in an extruder, preferably a twin-screw, to form a melted filled compound; (b) feeding continuous fibers through an extruder to combine with the melted filled compound to form a wet fiber filled compound bundle; and (c) passing the wetted fiber filled compound bundle through a die to form the strength member.

BRIEF DESCRIPTION OF THE DRAWINGS

FIG. 1 is graph of FRP Tensile Modulus versus Bending Stiffness.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components of the composition, the parameters of the process, and the like.

A "thermoplastic" material is a linear or branched polymer which can be repeatedly softened and made flowable when heated and returned to a hard state when cooled to room temperature. In the context of this invention, the thermoplastic material generally has an elastic modulus greater than 10,000 psi (68.95 MPa) using the method of ASTM D638-72. In addition, thermoplastics can be molded or extruded into articles of any predetermined shape when heated to the softened state.

"Propylene-based polymer," means a polymer that comprises a majority weight percent polymerized propylene monomer (based on the total amount of polymerizable monomers), and optionally may comprise at least one polymerized comonomer.

Tensile strength at break is measured in accordance with ASTM D638.

"Continuous Fiber," as used herein, is a fiber continuous in its length through out the entire roving. Depending on the size of the roving, the length of the continuous fiber may vary in a large range such as 5 to 30 km.

Strength Member

The strength member of the current invention comprises a thermoplastic resin composition and continuous fiber as reinforcement in the manufacture of the strength member. Possible fibers include but are not limited to glass, aramid, polyester, high molecular weight polyethylene, and carbon fibers. Fibers of the current invention typically have a modulus over 80 GPa, preferably between 80-90 GPa. The strength member has a higher flexibility while maintaining the high tensile strength compared with conventional FRP used in fiber optic cable. The flexibility of the strength member as characterized by its bending stiffness may be tailored within a broad range through effective resin formulation, e.g., about $0.1 \times 10^{-3}$ to about $2.5 \times 10^{-3}$ Pa m$^4$, $0.1 \times 10^{-3}$ to about $6.0 \times 10^{-3}$ Pa m$^4$, $3.0 \times 10^{-3}$ to $6.5 \times 10^{-3}$ Pa m$^4$, and preferably $3.26 \times 10^{-3}$ to about $6.08 \times 10^{-3}$ Pa m$^4$. The FRP tensile modulus of the strength member is typically between 49 GPa and 59 GPa.

Resin Composition

The invention uses a composition comprising polypropylene based thermoplastic material as its resin system. Table 1 shows possible formulations for the resin system. Various levels of talc may optionally be used as filler in the formulation to tailor the tensile modulus of the resin and consequently the bending stiffness of the strength member. Possible filler includes, but is not limited to talc, or other reinforcing fillers. Talc is typically present in 0, 15, or 30 weight percent relative to the weight of the resin composition.

TABLE 1

Formulation of the Resin Composition

| Component | Broad (wt %) | Preferred (wt %) | More Preferred (wt %) |
|---|---|---|---|
| Polypropylene | 40-99 | 50-93 | 70-85 |
| Filler | 0.0-45.0 | 0.0-40.0 | 0.0-30.0 |
| Additive Package: | 0.12-35.0 | 0.36-28.0 | 0.7-22.0 |
| Antioxidant | 0.01-10.0 | 0.05-8.0 | 0.1-6.0 |
| Processing Stabilizer | 0.01-10.0 | 0.01-8.0 | 0.1-6.0 |
| Adhesion Promoter | 0.1-15.0 | 0.3-12.0 | 0.5-10.0 |

By using a thermoplastic system, the strength member is readily recyclable, in contrast to conventional FRP that use thermoset materials which are not readily recyclable. Furthermore, the polypropylene based resin system of the invention has relatively low viscosity and the strength member may be pultruded through an extruder with a fiber pultrusion crosshead. This is in contrast to conventional FRP manufacturing process, which is essentially the traditional resin bath and inline curing type of pultrusion process. With the low viscosity of the resin under the temperature of the pultrusion crosshead, fibers can be wetted in a much more efficient way. In addition, the low viscosity will also help to remove the excess resin (in the form of "backflow") adhered to the fibers as the bundle passes through the die. Under conventional manufacturing processes it is difficult and costly to make custom cross section geometries. However, with the present invention, a strength member having a custom shaped cross section geometry can be made more efficiently, because the thermoplastic resin has relative low viscosity and may be formed into any shape easily. In addition, no curing is required for the thermoplastic resin.

In addition, various optional components are also advantageously employed in the resin composition of this invention. For example, additives which may be used include antioxidants, UV stabilizers, thickeners, bacteriocides, processing stabilizers, heat stabilizers, adhesive resins, colorants, coupling agents, flame retardants, mold release agents, anti-static agents, nucleating agents, fillers, or any combination thereof. The additives may be dispersed in a polymeric matrix that includes a carrier polymer that is the same or different than the polypropylene resin.

By way of specific example, in one embodiment, it is contemplated that one or more of an anti-oxidant (e.g., IRGANOX® 1010 antioxidant from Ciba, IRGANOX® PS 802 antioxidant) and a processing stabilizer (e.g., an active phosphiate, such as tris-(2,4-di-tert-butylphenyl) phosphite (IRGAFOS®168 from Ciba) will be compounded into the resin composition. A coupling agent, or adhesion promoter, such as OREVAC™ CA-100 resin from Arkema may be included.

Process of Manufacture

The polymer compound to be pultruded over the continuous fiber to make the FRP strength member can be made using conventional compounding processes, such as batch mixers (Banbury, etc.) or continuous mixers (FCM, etc.). In one embodiment, such a compound is made and isolated as a pelletized intermediate to be later used in the pultrusion process. In some cases it may also be desirable to pre-compound some of the ingredients and then add others during the pultrusion process. It may further be desired to compound all of the ingredients during the pultrusion process. For example, during pultrusion, the polymer compound is melt extruded at elevated temperatures to ensure that the resins are fully melted and reach a suitably low viscosity. Fibers are then fed through the extruder and wetted by the melted resin within the chamber inside the crosshead, where a high pressure (greater than 2000 psi) is used to ensure a good fiber wet-out with over 85% of resin coverage on the fibers. The wet fiber/resin bundle is then pulled through a forming die continuously and cooled to maintain its shape.

In one embodiment, the strength member is formed by heating a polypropylene resin composition comprising a reinforcing filler to form a melted filled compound. Continuous fibers are fed through an extruder to combine the continuous fibers with the melted filled compound to form a wetted filled compound bundle. The wetted fiber filled compound bundle is passed through a die to form the strength member.

SPECIFIC EMBODIMENTS

The formulation of Examples 1, 2 and 3 are found in Table 2. Continuous Advantex® E-glass fiber from Owens Corning SE4121 (modulus=81-83 GPa) was used in the examples.

TABLE 2

Percent Composition of Examples

| Material | Example 1 (wt %) | Example 2 (wt %) | Example 3 (wt %) |
|---|---|---|---|
| Polypropylene | 82.3 | 70.0 | 54.6 |
| ACHIEVE 6936G1 (Exxon Mobil) | 10.0 | 8.5 | 10.0 |
| Linear Low Density Polyethylene | 3.0 | 2.6 | 2.1 |
| IRGANOX 1010 (Ciba) | 0.2 | 0.2 | 0.1 |
| IRGAFOX 168 (Ciba) | 0.4 | 0.4 | 0.3 |
| IRGANOX PS 802 (Ciba) | 0.4 | 0 | 0.3 |
| Maleic Anhydride Modified Polypropylene | 3.8 | 3.2 | 2.6 |
| JetFil 700 Talc | 0 | 15.0 | 30.0 |
| Glass Fibers (Owen Cornings SE 4121) | 81.0 wt % of the final strength member | 80.5 wt % of the final strength member | 81.0 wt % of the final strength member |

ACHIEVE 6936G1 and the linear low density polyethylene are rheological modifiers of the resin used to optimize the viscosity of the compound. IRGANOX 1010, IRGAFOX 168, and IRGANOX PS 802 are used as antioxidants. Maleic anhydride modified polypropylene is used as an adhesion promoter. The polypropylene used in Examples 1-3 is a homopolymer with an MFR of 52 g/10min, a density of 0.9 g/cm$^3$, and a flex modulus of 1.65 GPa. The linear low density polyethylene has an MFR of 10 g/10 min, a density of 0.924 g/cm$^3$, and a flex modulus of 0.38 GPa.

Examples 1-3 are made by a pultrusion process. The individual resin components including the talc are first fed into an extruder through the main hopper. Mixing occurs in line as the material passes through the extruder to the crosshead, where an elevated temperature of 300° C. is used to make sure that the resins are fully melted and reach a desirably low viscosity. The glass fibers are then fed through the extruder and wetted by the melted compound within the chamber inside the crosshead, where a high pressure (greater than 2000 psi) is used to ensure a good fiber wet-out. The wet fiber/resin bundle is then pulled through a forming die continuously at a rate of 2 ft/minute and cooled to maintain its shape.

Table 3 indicates the properties of the examples in comparison with known, conventional resins used in FRP. The comparative examples in Table 3 include some of the popular epoxy vinyl ester resins available in the market which are used in the current FRP products. Derakane® epoxy vinyl ester resins are manufactured by Ashland. For the purpose of comparison, the FRP in consideration is round and has a 2 mm diameter.

The strength member under this invention offers a broader range of bending stiffness than currently used epoxy vinyl ester resins, while the tensile modulus remains the same. FIG. 1 shows the comparison in terms of tensile modulus and bending stiffness between the conventional FRPs of the Comparative Examples and the strength members of Examples 1-3. The figure demonstrates that using different epoxy vinyl ester resins available in the market, the bending stiffness of the FRP may be varied but limited within a relatively tight range of less than 15% from the mean value. On the other hand, through using difference formulations the strength member under this invention offers a much broader range of bending stiffness. More specifically, the strength member made using the formulation of Examples 1 or 2 is very flexible (with bending stiffness less than $2.5 \times 10^{-3}$ Pa m$^4$), while the strength member made using the formulation of Example 3 has similar stiffness as the current FRPs made using the DERAKANE MOMENTUM™ 640-900 Epoxy Vinyl Ester

TABLE 3

Modulus, Bending Stiffness, and Tensile Strength for resins of Examples 1-3 and Comparative Examples 1-10

| Example | Resin Composition | Resin Modulus (GPa) | Bending Stiffness ($10^{-3}$ Pa m$^4$) | Tensile Strength (GPa) |
|---|---|---|---|---|
| Example 1 | (see Table 2) | 1.7 | 3.26 | 49 |
| Example 2 | (see Table 2) | 2.34 | 4.48 | 49 |
| Example 3 | (see Table 2) | 3.17 | 6.08 | 49 |
| Comparative Example 1 | Derakane 411-350 Epoxy Vinyl Ester Resin | 3.2 | 6.13 | 49 |
| Comparative Example 2 | Derakane Momentum ™ 640-900 Epoxyl Vinyl Ester Resin | 3.4 | 6.52 | 49 |
| Comparative Example 3 | Derakane Momentum ™ 510C-350 Epoxy Vinyl Ester Resin | 3.2 | 6.13 | 49 |
| Comparative Example 4 | Derakane 470HT-400 Epoxyl Vinyl Ester Resin | 3.5 | 6.71 | 49 |
| Comparative Example 5 | Derakane 510A-40 Epoxy Vinyl Ester Resin | 3.4 | 6.52 | 49 |
| Comparative Example 6 | Derakane 510C-350 Epoxyl Vinyl Ester Resin | 3.2 | 6.13 | 49 |
| Comparative Example 7 | Derakane 8084 Epoxy Vinyl Ester Resin | 2.9 | 5.56 | 49 |
| Comparative Example 8 | Derakane 8090 Epoxy Vinyl Ester Resin | 3 | 5.75 | 49 |
| Comparative Example 9 | Derakane Momentum ™ 411-350 Epoxy Vinyl Ester Resin | 3.2 | 6.13 | 49 |
| Comparative Example 10 | Derakane Momentum ™ 470-300 Epoxy Vinyl Ester Resin | 3.6 | 6.90 | 49 |
| Comparative Example 11 | Derakane 470-300 Epoxy Vinyl Ester Resin | 3.6 | 6.90 | 49 |

The resin modulus was measured following the testing standard ASTM D790.

The bending stiffness was measured following the testing standard ASTM D790 (Examples 1-3) or calculated from moduli of the components and dimensions of the strength member (Comparative examples 1-10).

One of the advantages of the strength member under this invention is improved flexibility while maintaining high tensile strength. For a continuous fiber (aligned in the length direction) reinforced strength member, its bending stiffness is mostly determined by the flex modulus of the resin. The resin (with bending stiffness close to $6 \times 10^{-3}$ Pa m$^4$). Most importantly, the strength member of this invention achieves the flexibility without sacrificing the tensile modulus; essentially it offers the same tensile modulus as the FRPs currently in the market.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed:

1. A strength member comprising:
   (a) a polypropylene composition comprising a reinforcing filler; and
   (b) a continuous fiber having a modulus greater than 80 GPa.

2. The strength member of claim 1, wherein the reinforcing filler is talc.

3. The strength member of claim 2, further comprising:
   (a) talc between 1 wt % and 30 wt %, based on the weight of the polypropylene composition; and
   (b) the continuous fiber having a modulus between 80 GPa and 90 GPa.

4. The strength member of claim 1, wherein the continuous fiber is selected from glass, aramid, polyester, high molecular weight polyethylene, and carbon fibers.

5. A strength member comprising
   (a) a polypropylene composition comprising a reinforcing filler and at least one of an antioxidant, processing stabilizer, heat stabilizer and adhesive promoter; and
   (b) a continuous fiber having a modulus greater than 80 GPa.

6. The strength member of claim 5 having a bending stiffness less than $2.5 \times 10^{-3}$ Pa m$^4$ and greater than $0.1 \times 10^{-3}$ Pa m$^4$ for a 2 mm diameter strength member and a FRP tensile modulus greater than 49 GPa.

7. The strength member of claim 5 having a bending stiffness less than $6.0 \times 10^{-3}$ Pa m$^4$ and greater than $0.1 \times 10^{-3}$ Pa m$^4$ for a 2 mm diameter strength member.

8. The strength member of claim 5 having a bending stiffness between $3.26 \times 10^{-3}$ Pa m$^4$ and $6.08 \times 10^{-3}$ Pa m$^4$ for a 2 mm diameter strength member and a FRP tensile modulus greater than 49 GPa.

9. The strength member of claim 5 having a FRP tensile modulus between 49 GPa and 59 GPa.

10. The strength member of claim 5 in which the polypropylene composition comprises at least two of an antioxidant, processing stabilizer, heat stabilizer and adhesive promoter.

11. The strength member of claim 5 in which the polypropylene composition comprises at least three of an antioxidant, processing stabilizer, heat stabilizer and adhesive promoter.

12. The strength member of claim 5 in which the polypropylene composition comprises all four of an antioxidant, processing stabilizer, heat stabilizer and adhesive promoter.

13. The strength member of claim 5 in which the polypropylene composition comprises an antioxidant and a processing stabilizer.

14. The strength member of claim 13 in which the polypropylene composition comprises in weigh percent based on the weight of the polypropylene composition:
   (1) 40-99% Polypropylene;
   (2) Not in excess of 45% filler;
   (3) 0.01-10% Antioxidant;
   (4) 0.01-10% Processing stabilizer; and
   (5) 0.1-15% Adhesive promoter.

15. The strength member of claim 14 in which the filler is talc.

16. The strength member of claim 14 in which the adhesive promoter is maleic anhydride grafted polypropylene.

17. A fiber optic cable comprising the strength member of claim 1.

18. A fiber optic cable comprising the strength member of claim 5.

* * * * *